United States Patent
Zurn

[11] Patent Number: 5,988,776
[45] Date of Patent: Nov. 23, 1999

[54] SOFT BOTTOM FLEXIBLE TRACK BELT ASSEMBLY

[75] Inventor: Daniel J. Zurn, Horace, N. Dak.

[73] Assignee: Loegering Mfg. Inc., Casselton, N. Dak.

[21] Appl. No.: 08/982,649

[22] Filed: Dec. 2, 1997

[51] Int. Cl.[6] ................................................. B62D 55/205
[52] U.S. Cl. ...................... 305/157; 305/111; 305/119; 305/185; 305/189; 305/198; 305/201
[58] Field of Search .................................. 305/111, 119, 305/185, 189, 193, 195, 196, 198, 201

[56] References Cited

U.S. PATENT DOCUMENTS

| | | | |
|---|---|---|---|
| D. 303,264 | 9/1989 | Comellas . | |
| 1,300,282 | 4/1919 | Lambert | 305/201 |
| 1,597,454 | 8/1926 | Miller | 305/19 |
| 1,705,980 | 4/1929 | Knox et al. | 305/196 |
| 1,924,161 | 8/1933 | Knox | 305/201 |
| 2,283,936 | 5/1942 | Knox | 305/42 |
| 2,350,445 | 6/1944 | Burgess | 305/197 |
| 2,422,023 | 6/1947 | Kropp . | |
| 2,917,095 | 12/1959 | Galanot | 305/19 |
| 3,387,897 | 6/1968 | Reid | 305/41 |
| 3,467,446 | 9/1969 | Seelbach et al. | 305/201 |
| 3,504,951 | 4/1970 | Hirych . | |
| 3,520,574 | 7/1970 | Wiesner | 305/161 |
| 3,539,230 | 11/1970 | Comellas . | |
| 3,649,085 | 3/1972 | Comellas . | |
| 3,659,908 | 5/1972 | Comellas . | |
| 3,736,032 | 5/1973 | Mosshart et al. | 305/195 |
| 4,099,794 | 7/1978 | Hoffart . | |
| 4,141,600 | 2/1979 | Orpana | 305/163 |
| 4,278,203 | 7/1981 | Martin . | |
| 4,279,449 | 7/1981 | Martin et al. . | |
| 4,810,043 | 3/1989 | McIntosh | 305/19 |
| 4,840,438 | 6/1989 | Cory | 305/160 |
| 5,156,695 | 10/1992 | Martin . | |
| 5,255,964 | 10/1993 | Hara . | |
| 5,261,733 | 11/1993 | Hara . | |
| 5,284,387 | 2/1994 | Loegering . | |
| 5,362,142 | 11/1994 | Katoh . | |
| 5,380,076 | 1/1995 | Hori . | |
| 5,409,306 | 4/1995 | Bentz | 305/193 |
| 5,429,429 | 7/1995 | Loegering et al. . | |
| 5,685,620 | 11/1997 | Bertoni | 305/201 |

*Primary Examiner*—D. Glenn Dayoan
*Assistant Examiner*—Long Bao Nguyen
*Attorney, Agent, or Firm*—Moore & Hansen

[57] ABSTRACT

The soft bottom track assembly of the present invention includes inner pad assemblies, side plate assemblies, and link and cross bolt assemblies. An inner pad assembly includes a multiplicity of longitudinally arranged pads, hingedly attached one to the next, each having an upper iron casting with a rubber/urethane material bonded thereto. The pads are arranged in rows, with each row staggered from each adjacent row so that there are always pads in contact with the surface on which the track is riding. A raised area on the cast iron backing provides traction between the tire and the track assembly. Each pad includes holes for hinged attachment to adjacent pads, also permitting adjustment of the size of the track length, depending on the hole arrangement selected during track assembly installation.

9 Claims, 5 Drawing Sheets

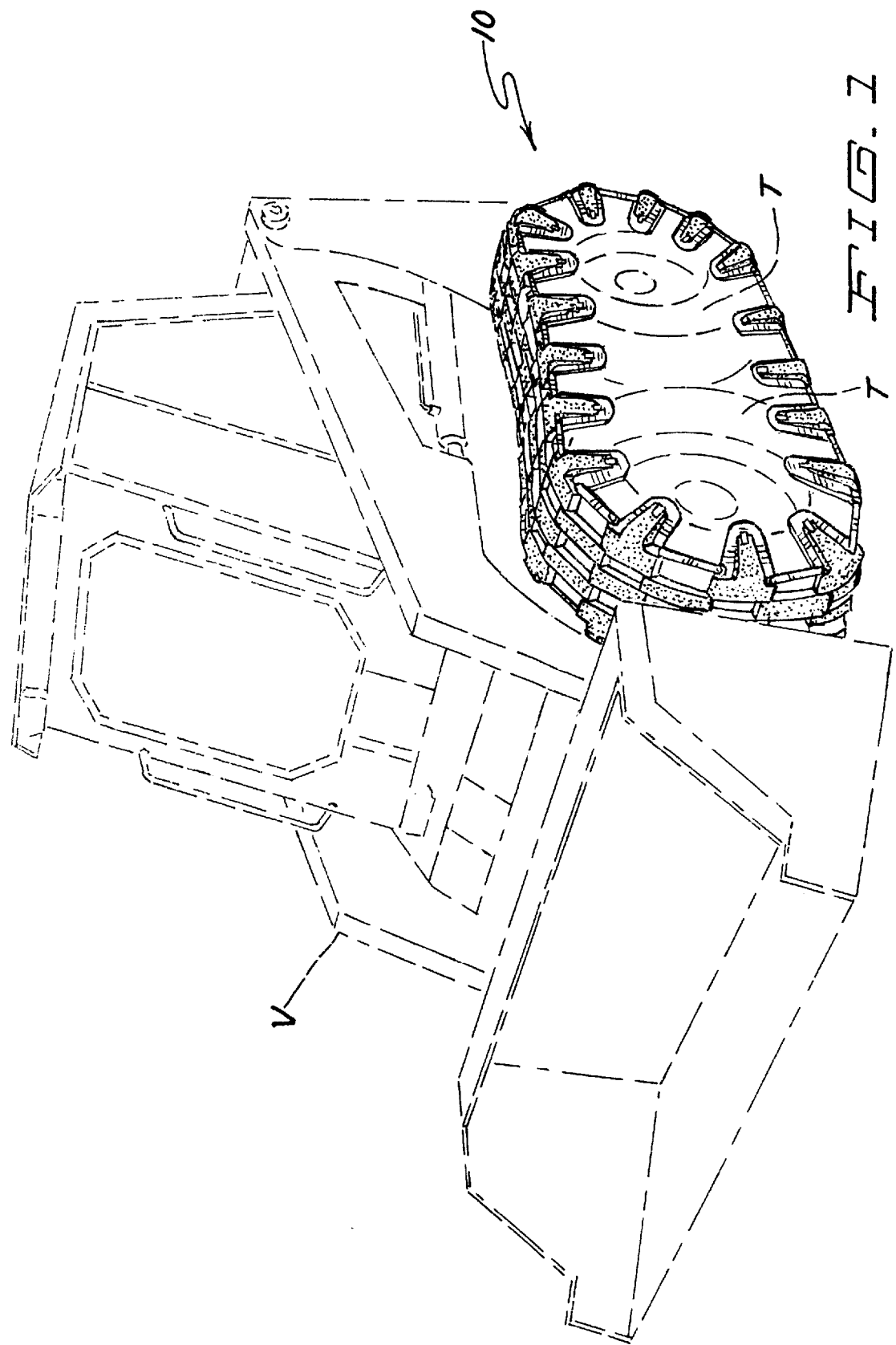

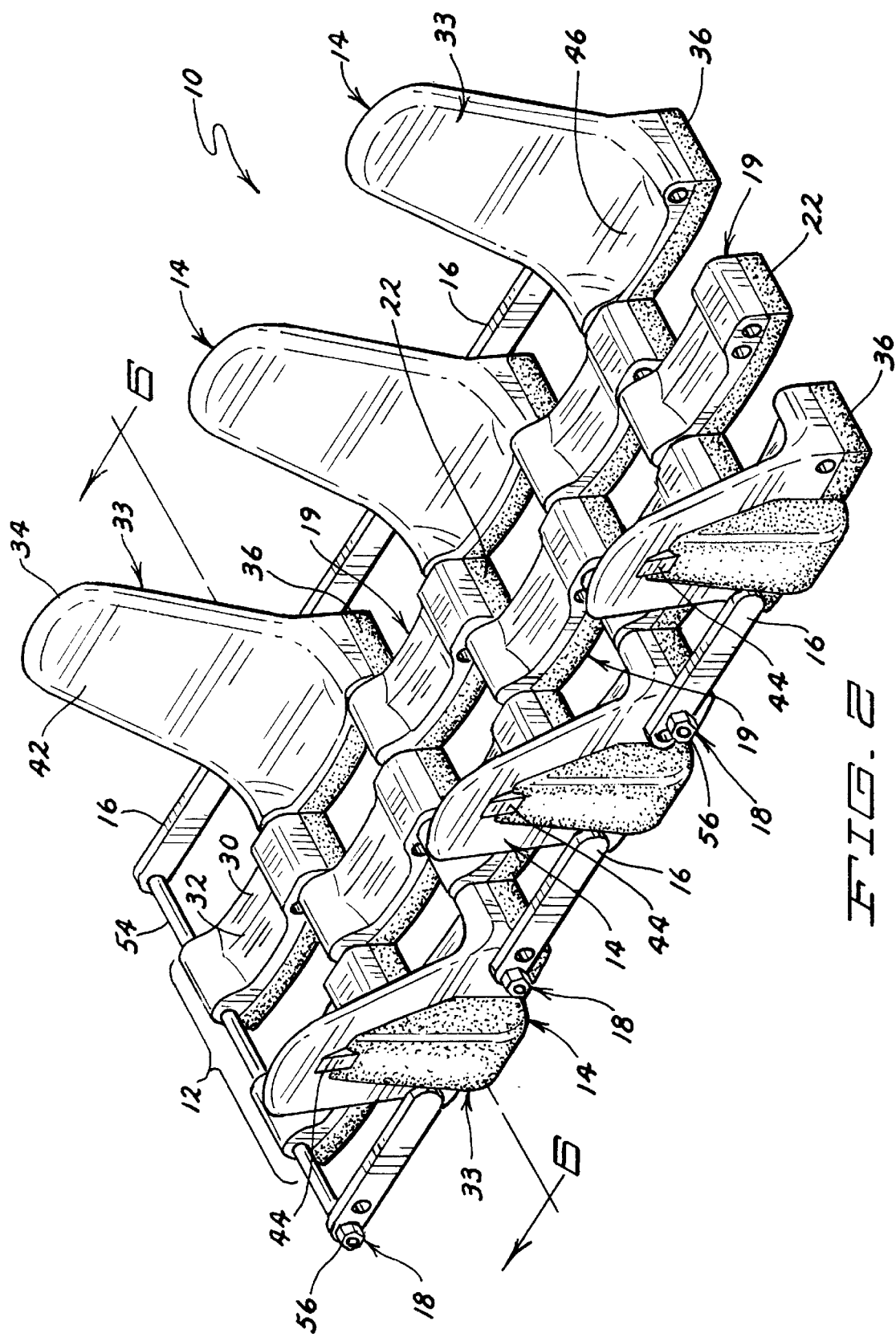

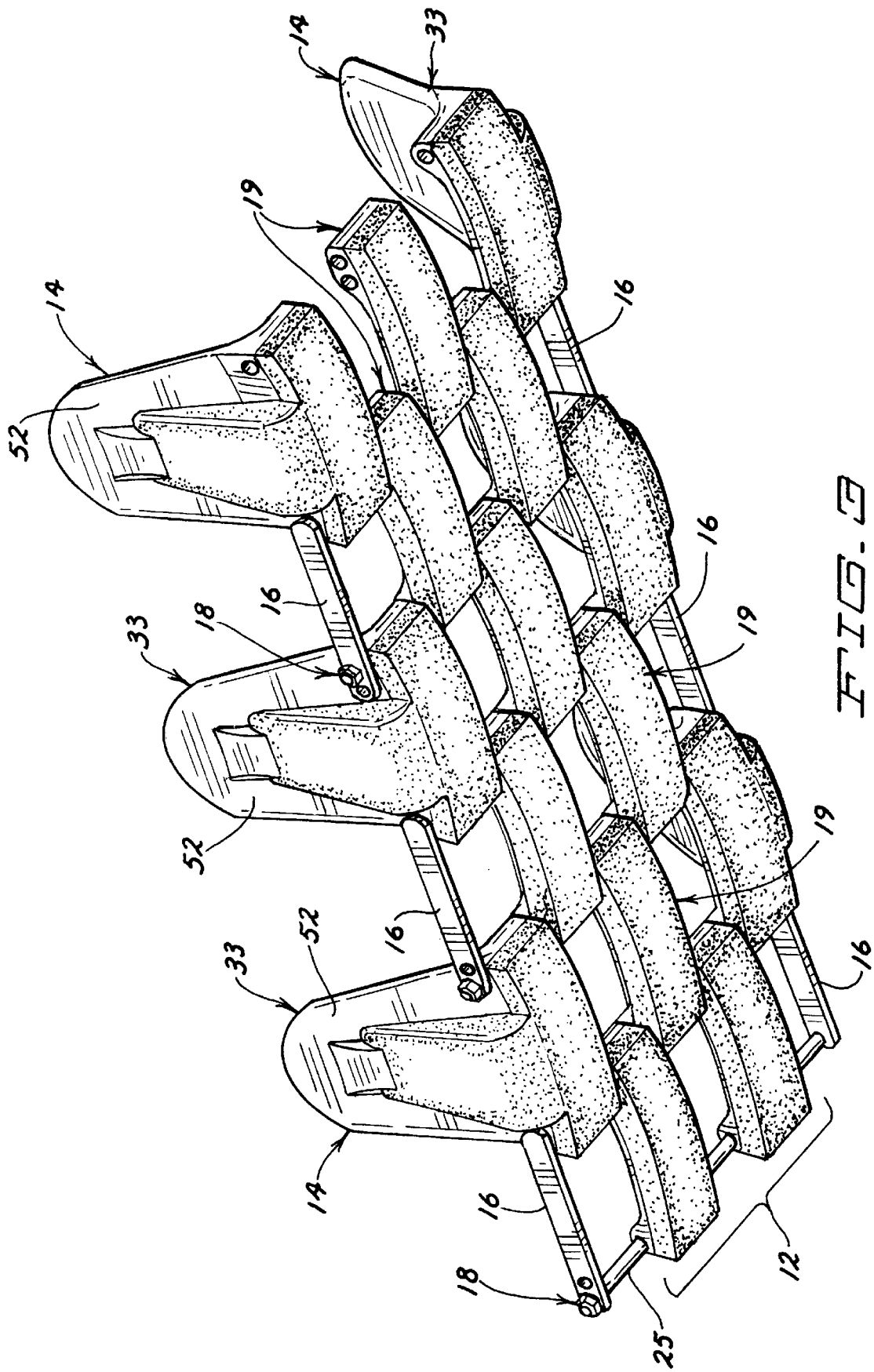

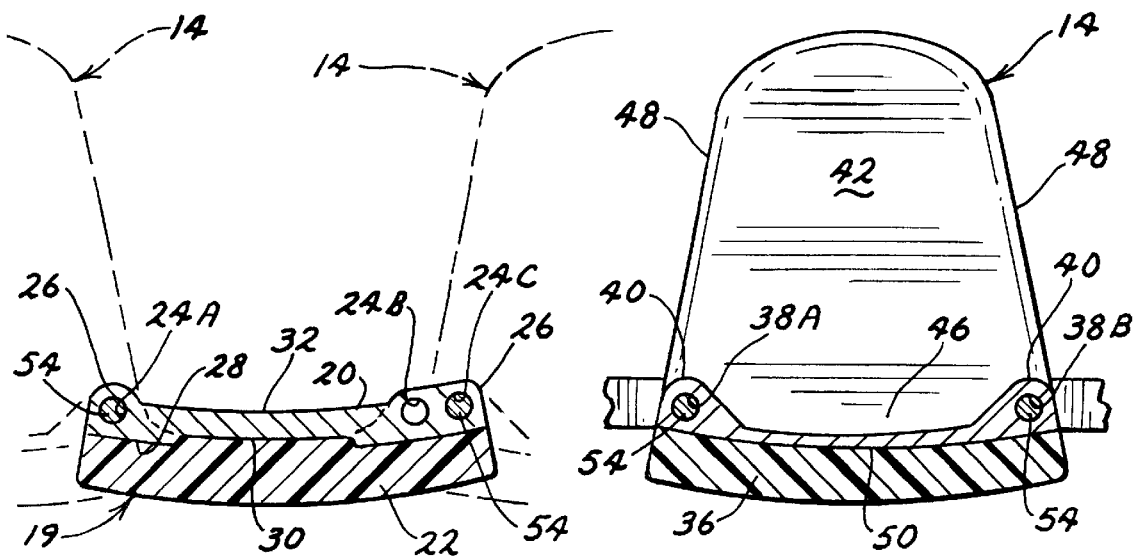
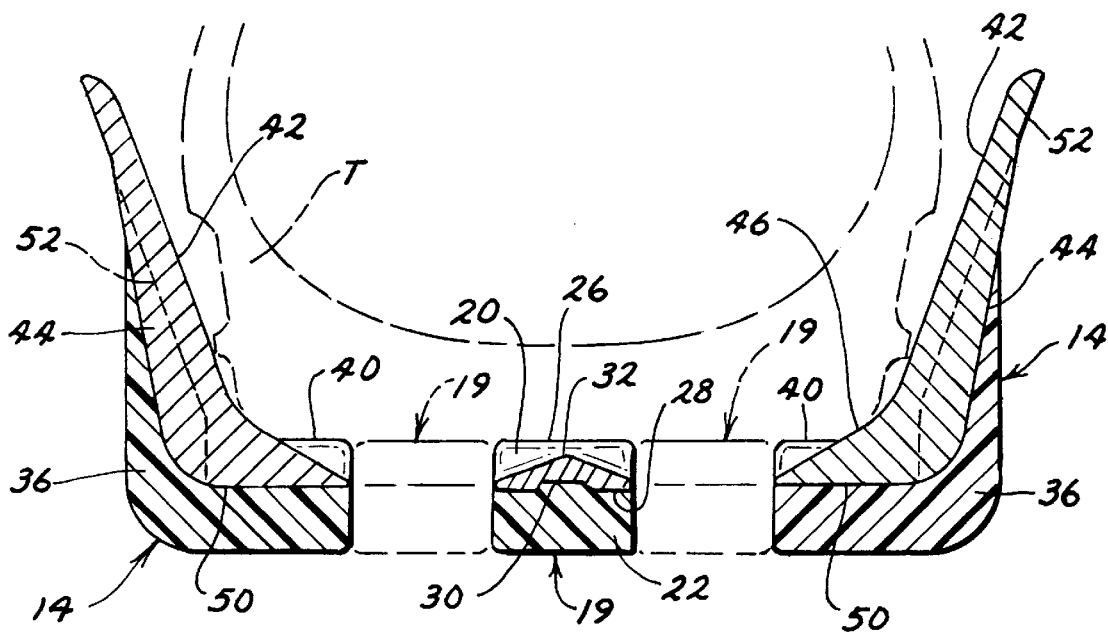

SOFT BOTTOM FLEXIBLE TRACK BELT ASSEMBLY

BACKGROUND OF THE INVENTION

1. Technical Field

The present invention relates generally to removable, flexible track belts used to wrap around vehicle tires to provide additional traction and particularly to an improved track section for such track belts for use in areas where additional floatation is required and damage to the median being operated on held to a minimum.

2. Background Information

The use of an endless track as a traction enhancer for wheeled vehicles is well known. Typically, such endless track belts comprise a plurality of individual track sections, made of steel, that are linked together for pivotal movement with respect to adjacent track sections. These track belts have traditionally been used to obtain better overall traction for the vehicle generally and in wet and slippery conditions in particular. Examples of such prior art track belts are disclosed in U.S. Pat. No. 5,284,387, issued to Loegering on Feb. 8, 1994, and references cited therein. The Loegering patent discloses a track section linked to a plurality of similar track sections to form a flexible track belt for wrap-around mounting on a vehicle tire, wherein each track section has a rigid, ground engaging base pad and a pair of spaced apart side wall structures that include a side plate and a pair of side plate support segments.

Market demand has created a need, however, for a track assembly referred to as a soft bottom track. The track assembly preferably provides floatation similar to conventional track systems, improves the traction of a skid-steer in slick conditions and eliminates or drastically reduces damage to concrete, cobblestone, asphalt, or any other surface on which the machine may be operating. An example of such prior art track belts is disclosed in U.S. Pat. No. 3,649,085, issued to Comellas on Mar. 14, 1972. The Comellas patent discloses a track having a ground-engaging surface, including staggered recesses, made of an elastomeric material that is substantially flat, smooth and free of projections.

Performance characteristics of these and related prior art devices, however, have fallen short of expectations, including especially the reduced life of the track pad, resulting in increased frequency of replacement, resulting in an increased operating cost. Additionally, as the softer ground-engaging material of prior art pads has worn away, gouging has resulted as the edges of the track assembly members have become exposed to the surface.

The soft bottom track assembly of the present invention overcomes difficulties described above and affords other features and advantages heretofore not available.

SUMMARY OF THE INVENTION

The soft bottom track assembly of the present invention includes inner pad assemblies, side plate assemblies, and link and cross bolt assemblies. An inner pad assembly includes a multiplicity of longitudinally arranged pads, hingedly attached one to the next, each having an upper iron casting with a rubber/urethane material bonded thereto. The pads are arranged in rows, with each row staggered from each adjacent row so that there are always pads in contact with the surface on which the track is riding. A raised area on the cast iron backing provides traction between the tire and the track assembly. Each pad includes holes for hinged attachment to adjacent pads, also permitting adjustment of the size of the track length, depending on the hole arrangement selected during track assembly installation.

Side plates are opposably spaced along the outer edge of the track assembly, maintaining the track assembly in proper position on the tire to which it is attached. The side plates also have an upper iron casting with a rubber/urethane material bonded thereto.

It is an object of the present invention to provide a soft bottom track assembly that is sturdy and flexible, providing the best features of a conventional track belt. It is a further object of the invention to provide a soft bottom track assembly that will minimize surface damage to the area on which the track is being used. It is a further object of this invention to provide such a track that has extended wear properties, and will reduce surface damage to the area on which the track is being used as the surface contact elements wear out.

Other objects and advantages of the invention will become apparent from the following detailed description and from the appended drawings in which like numbers have been used to describe like parts throughout the several views.

BRIEF DESCRIPTION OF THE DRAWINGS

FIG. 1 is a perspective view of a skid loader equipped with the soft bottom track assembly of the present invention;

FIG. 2 is an upper perspective view of a segment of the soft bottom track assembly;

FIG. 3 is a lower perspective view of a segment of the soft bottom track assembly;

FIG. 6 is a sectional view taken along line 6—6 of FIG. 2;

FIG. 7 is a sectional view taken along line 7—7 of FIG. 5; and

FIG. 8 is a sectional view taken along line 8—8 of FIG. 5.

DESCRIPTION OF THE PREFERRED EMBODIMENT

Figure 5:
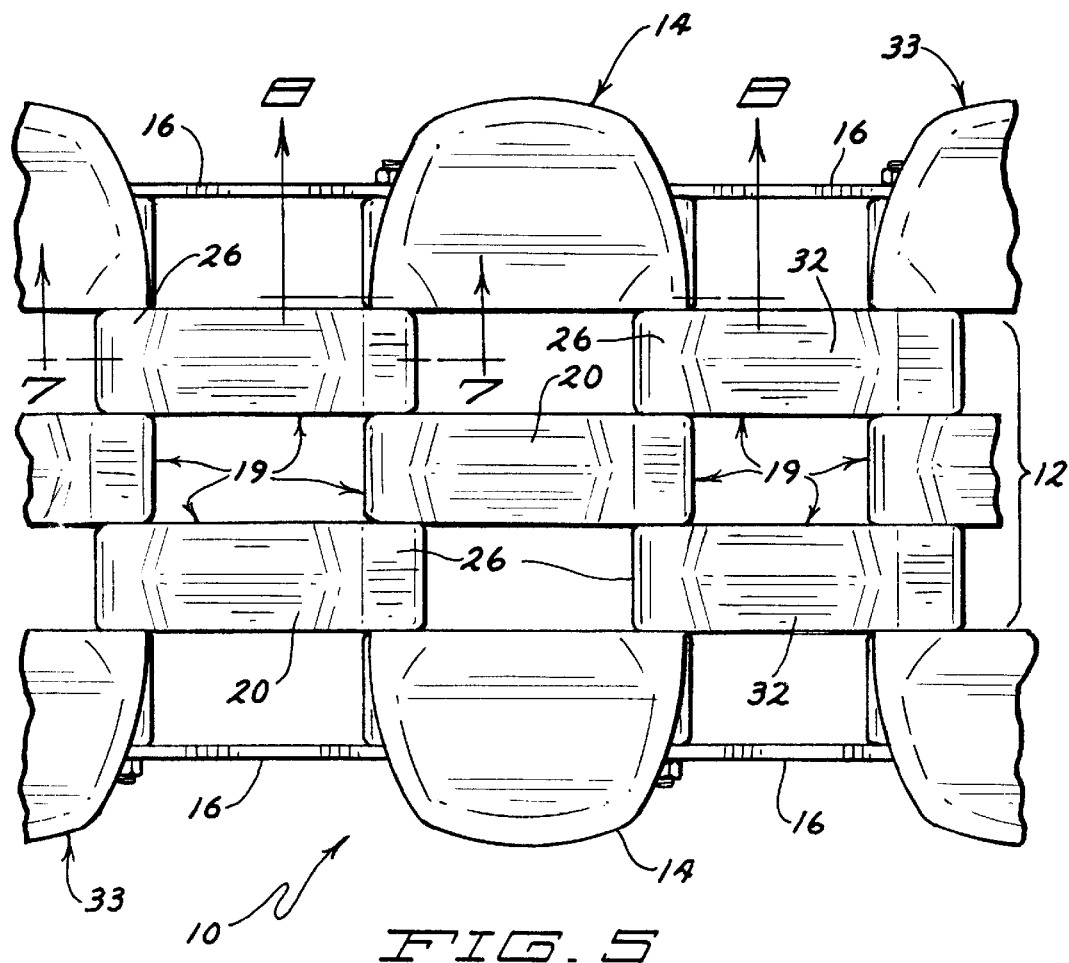
FIG. 5 is a top view of the soft bottom track assembly.

With reference to the drawings, and in particular to FIG. 1, the soft bottom track assembly is generally indicated by reference numeral 10. Here track assembly 10 is shown mounted to the tires T of an operating vehicle V. As seen in FIGS. 2 and 3, track assembly 10 includes an inner pad assembly 12, side plate assemblies 14, links 16, and retention bolt assemblies 18.

Referring to FIG. 7, inner pad assembly 12 includes a multiplicity of pad members 19. Pad members 19 include nodular iron casting 20 and a rubber/urethane material 22 bonded thereto using an adhesive bonding operation. The adhesive bonding operation preferably is of a type known to those in the industry, and involves cleaning the bonding surface of casting 20 with a bead shot blast, followed by an alcohol dip to remove excess particles, application of a suitable bonding agent, which is then cured in an oven, and finally pouring the rubber/urethane resin in a mold containing casting 20 and curing the resulting assembly. The material combination may be varied to allow for the best matrix for the given surface medium being operated on. The preferred rubber/urethane material for pad members 19 is a polyurethane having Uniroyal part number LF1950A with a durometer range of RA-90 to RA-95. It is preferred that rubber/urethane layer 22 be approximately ⅝ inch thick. The rate of wear of rubber/urethane layer 22 is a function of the operating conditions. More severe conditions will induce a higher wear rate.

Iron casting 20 of pad member 19 includes a plurality of apertures 24A, 24B, 24C which are used as pivot points relative to the next adjacent pad member 19. Cleats 26 are formed from the raised areas over apertures 24A, 24B, 24C, providing traction between the tire T and track assembly 10. Preferably, cleats 26 are rounded to allow for slippage between tire T and track assembly 10 to prevent overload of the drive system on the operating vehicle V. This slippage is accomplished in one of two ways. The first way is when track assembly 10 has engaged the ground in a fashion that it does not allow slippage therebetween. As a relief mechanism tire T is allowed to slip inside track assembly 10 once the breakout force between the lug engagement and track assembly 10 has been exceeded. The second way of permitting slippage is when the two tandem tires—i.e., front and rear—differ in diameter. Since the tires T are mechanically linked the difference in the perimeter of tires T has to be accounted for. This has to be accomplished by allowing slippage between tire T and track assembly 10. If slippage does not occur, track assembly 10 and/or the drive train of the vehicle V will be exposed to undue and damaging stress.

Preferably, three apertures 24A, 24B and 24C are provided in casting 20. It is further preferable that the centerpoint of aperture 24A is approximately 5 inches from the centerpoint of aperture 24C. Furthermore, it is preferable that the centerpoint of aperture 24C be approximately ¾ inch from the centerpoint of aperture 24B. Retention bolt 54, described below, passes through aperture 24A of a first inner pad member 19 and either aperture 24B or 24C of an adjacent inner pad member 19. The ability to select between second and third apertures 24B, 24C, respectively permits an adjustment of approximately ¾ inch in the length of track assembly 10 for each row of inner pad members 19.

It is further preferable that the overall length of iron casting 20 be approximately 6 inches, and that casting 20 be curved somewhat, the lower surface 28, to which rubber/ urethane layer 22 is bonded, forming an arc having a radius of approximately two times the radius of tire T.

The curve of outer surface 28 precludes contact between casting 20 and the operating medium until rubber/urethane layer 22 is worn away, thereby preventing edge gouging, which has been a problem in prior art designs. As shown in FIGS. 6 and 7, a pocket 30 is included in lower surface 28 to improve adhesion characteristics between rubber/ urethane layer 22 and casting 20. Referring further to FIG. 6, upper surface 32 of casting 20 includes a generally V-shaped profile to help extrude material away from the face of tire T. This helps prevent the buildup of debris between the face of tire T and track assembly 10, and minimizes the potential for inadvertent contact between track assembly 10 and the operating vehicle V.

As illustrated in FIG. 8, side plate assembly 14 includes a multiplicity of side plate members 33. Side plate members 33 include a nodular iron casting 34 forming a side plate, and a rubber/urethane layer 36. As with pad member 19, the preferred rubber/urethane material for side plate members 33 is a polyurethane having Uniroyal part number LF1950A with a durometer range of RA-90 to RA-95, and is applied using the same method described for pad member 19. Iron casting/side plate 34 provides structural integrity for both load reaction and tire sidewall engagement. First aperture 38A and second aperture 38B pass through casting 34 to provide pivot points between side plate members 33 and adjacent inner pad members 19. An adjustment aperture is not provided in side plate member 33 because the track length can be adjusted using the third hole in inner pad assemblies 12. Cleats 40 over apertures 38A, 38B are present for lug engagement. Cleats 40 act in the same manner described for cleats 26 of inner pad members 19.

Referring to FIG. 6, inner surface 42 of side plate 34 maintains the position of track assembly 10 during high side load applications. During normal operation, with inner surface 42 bearing against tire T, side plate 34 acts as a guidance device for minor track to tire misalignment adjustments. A load bearing web 44 extends down the central portion of the outer side of side plate 34 to accommodate shock loading and/or point loading between tire T and side plate 34. Material or debris uses a similar egress path as that identified for pad assembly 12 as it exits through a sloped surface 46 and is forced out between the adjacent inner pad members 19 and side plate members 33.

As best seen in FIG. 8, the outer edges 48 of side plate casting 34 are aligned at an angle preferably not to exceed approximately 22.05°. Preferably, the angle formed by outer edges 48 intersects the center point of the radius of side plate lower surface 50. The indicated angle provides side plate to side plate clearance, and preferably should not be exceeded, at the risk of impeding the motion of track assembly 10. Lower surface 50 is curved to preclude contact between casting 34 and the ground or other operating medium until the rubber/urethane layer 36 is worn away to help prevent edge gouging.

Rubber/urethane layer 36 is bonded to casting 34 using an adhesive bonding operation. The matrix combination may be varied to allow for the best material for the given source medium being operated on. Preferably a ⅝ inch thickness of the rubber/urethane material is bonded to lower surface 50 of casting 34. The rate of wear is a function of the operating conditions. More severe conditions will induce a higher rate of wear. Rubber/urethane layer 36 is wrapped upwardly around the outer surface 52 of casting 34 and support web 44 to provide curb protection. This allows the operator more flexibility when operating on and around uneven surfaces that need protection. There is also protection afforded to the bolt head and nut of retention bolt assembly 18 that may not otherwise have been available without curb protection.

Figure 4:
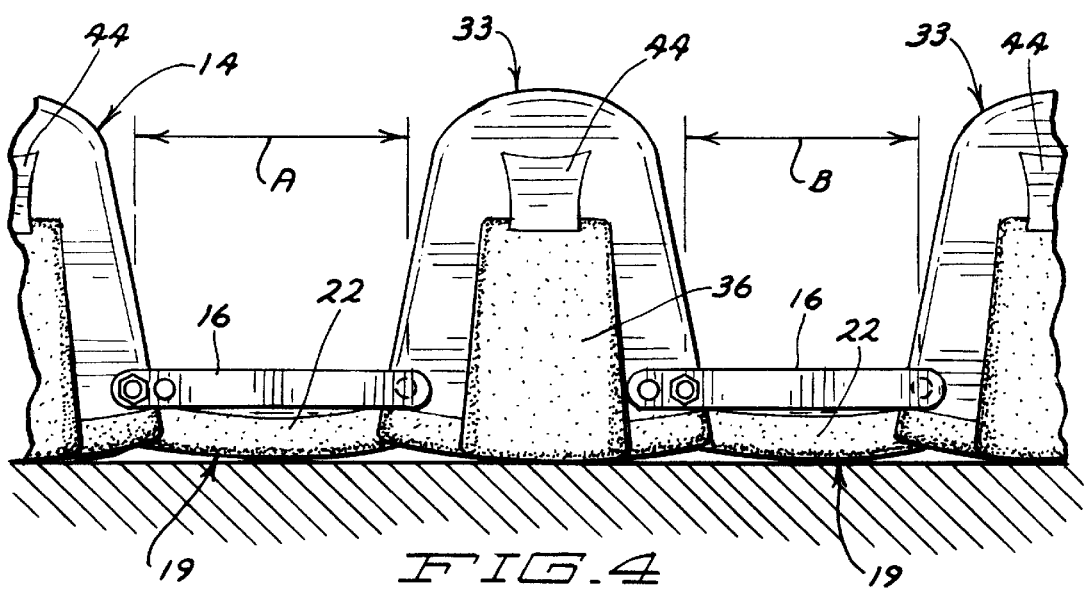
FIG. 4 is a side view of the soft bottom track assembly.

Link 16 is an essential load bearing mechanism, as it aids in reacting the load throughout the full structure of track assembly 10. Link 16 is preferably mechanically fastened, as, for example, by welding, to one end of retention bolt 54 of retention bolt assembly 18 to prevent premature loss of retention bolt 54, which threads through side plate assemblies 14 and inner pad assembly 12. Loss or removal of a single retention bolt 54 can only be accomplished by removing the nut 56 on the bolt 54 being removed and the nut 56 on the adjacent link/bolt assembly, as best illustrated in FIGS. 2 and 3. As best illustrated in FIG. 4, link 16 includes multiple apertures corresponding to second and third apertures 24B, 24C, respectively, of pad member 19, permitting adjustment of the length of the track in increments between dimension A and dimension B. Retention bolt assembly 18 provides the pivot point between adjacent pad members 19 and side plate members 33. The pivot provides the continuous hinge that allows track assembly 10 to operate. The full basis and the premise on which material egress is allowed is due to the ability of the track to flex and move freely yet within a confined environment. The motion of track assembly 10 aids material egress. As the track passes about the face of tire T, the spacing between inner pads increases allowing pressure between tire T and V-shaped inner surface 32 of casting 20 to force material through the openings. After passing the face of tire T and operating between the tires T the spacing closes to inhibit debris and material from entering the confines of the interior of track assembly 10.

While the preferred embodiments of the invention have been described, it should be understood that various changes, adaptations and modifications may be made therein without departing from the spirit of the invention and the scope of the appended claims.

What is claimed is:

1. A soft bottom flexible track belt assembly for wrap-around mounting on vehicle tires, said track assembly comprising:

a multiplicity of ground-engaging members, said ground-engaging members having a ground-engaging portion, a first end and a second end, said ground-engaging members comprising pad members and side plate members;

an inner pad assembly including a multiplicity of said pad members arranged in a plurality of rows, said inner pad assembly having a first side and a second side, and said pad members having an upper surface and a lower surface and a first end and a second end, whereby said inner pad assembly is arranged with said first end of one said pad member pivotally linked to said second end of another said pad member in a next adjacent row, said pad members being thereby linked to form a matrix having gaps between said first end of a said pad member and said second end of a next said pad member in a row;

first and second side plate assemblies including a multiplicity of said side plate members, said first and second side plate assemblies having an inner side and an outer side, said side plate members having an inner surface and an outer surface, said inner surface of said side plate members being disposed toward said inner side of said side plate assemblies and said outer surface of said side plate members being disposed toward said outer side of said side plate assemblies, said inner sides of said first and second side plate assemblies being disposed on said first and second sides of said inner pad assembly, respectively, each said side plate assembly being pivotally connected to said inner pad assembly;

means for pivotally linking each said ground-engaging member to an adjacent said ground-engaging member;

each said pad member further comprises a rigid upper portion; and a pliable lower portion attached to said rigid upper portion, forming said lower surface of said pad member;

said rigid upper portion includes said upper surface of said pad member and a rigid lower surface, with said pliable lower portion being attached to said rigid lower surface;

said upper surface of said pad member includes an inverted V-shaped profile; and said rigid lower surface of said rigid upper portion includes a generally longitudinal pocket for secure engagement with said pliable lower portion.

2. The soft bottom flexible track belt assembly described in claim 1, wherein said pliable lower portion of said pad member is made of polyurethane.

3. A soft bottom flexible track belt assembly for wrap-around mounting on vehicle tires, said track assembly comprising:

a multiplicity of ground-engaging members, said ground-engaging members having a ground-engaging portion, a first end and a second end, said ground-engaging members comprising pad members and side plate members;

an inner pad assembly including a multiplicity of said pad members arranged in a plurality of rows, said inner pad assembly having a first side and a second side, and said pad members having an upper surface and a lower surface and a first end and a second end, whereby said inner pad assembly is arranged with said first end of one said pad member pivotally linked to said second end of another said pad member in a next adjacent row, said pad members being thereby linked to form a matrix having gaps between said first end of a said pad member and said second end of a next said pad member in a row;

first and second side plate assemblies including a multiplicity of said side plate members, said first and second side plate assemblies having an inner side and an outer side, said side plate members having an inner surface and an outer surface, said inner surface of said side plate members being disposed toward said inner side of said side plate assemblies and said outer surface of said side plate members being disposed toward said outer side of said side plate assemblies, said inner sides of said first and second side plate assemblies being disposed on said first and second sides of said inner pad assembly, respectively, each said side plate assembly being pivotally connected to said inner pad assembly; and means for pivotally linking each said ground-engaging member to an adjacent said ground-engaging member;

each said pad member further comprises a rigid upper portion; and a pliable lower portion attached to said rigid upper portion, forming said lower surface of said pad member;

Said rigid upper portion includes said upper surface of said pad member and a rigid lower surface, with said pliable lower portion being attached to said rigid lower surface;

Said upper surface of said pad member includes first and second upwardly extending cleats, said first and second cleats being positioned adjacent said first and second ends of said pad member, respectively.

4. A soft bottom flexible track belt assembly for wrap-around mounting on vehicle tires, said track assembly comprising:

a multiplicity of ground-engaging members, said ground-engaging members having a ground-engaging portion, a first end and a second end, said ground-engaging members comprising pad members and side plate members;

an inner pad assembly including a multiplicity of said pad members arranged in a plurality of rows, said inner pad assembly having a first side and a second side, and said pad members having an upper surface and a lower surface and a first end and a second end, whereby said inner pad assembly is arranged with said first end of one said pad member pivotally linked to said second end of another said pad member in a next adjacent row, said pad members being thereby linked to form a matrix having gaps between said first end of a said pad member and said second end of a next said pad member in a row;

first and second side plate assemblies including a multiplicity of said side plate members, said first and second side plate assemblies having an inner side and an outer side, said side plate members having an inner surface and an outer surface, said inner surface of said side plate members being disposed toward said inner side of said side plate assemblies and said outer surface of said side plate members being disposed toward said outer side of said side plate assemblies, said inner sides of said first and second side plate assemblies being disposed on said first and second sides of said inner pad assembly, respectively, each said side plate assembly being pivotally connected to said inner pad assembly;

means for pivotally linking each said ground-engaging member to an adjacent said ground-engaging member;

said side plate members further comprise a rigid upper portion; and a pliable lower portion attached to said rigid upper portion;

said rigid upper portion of said side plate member further comprises:

a generally outwardly and upwardly angled plate segment having an inner surface and an outer surface, said angled plate segment projecting from said outer side of said first and second side plate assemblies; and said upper surface of said side plate member includes first and second upwardly extending cleats, said first and second cleats being positioned adjacent said first and second ends of said side plate member, respectively.

5. A soft bottom flexible track belt assembly for wrap-around mounting on vehicle tires, said track assembly comprising:

a multiplicity of ground-engaging members, said ground-engaging members having a ground-engaging portion, a first end and a second end, said ground-engaging members comprising pad members and side plate members;

an inner pad assembly including a multiplicity of said pad members arranged in a plurality of rows, said inner pad assembly having a first side and a second side, and said pad members having an upper surface and a lower surface and a first end and a second end, whereby said inner pad assembly is arranged with said first end of one said pad member pivotally linked to said second end of another said pad member in a next adjacent row, said pad members being thereby linked to form a matrix having gaps between said first end of a said pad member and said second end of a next said pad member in a row;

first and second side plate assemblies including a multiplicity of said side plate members, said first and second side plate assemblies having an inner side and an outer side, said side plate members having an inner surface and an outer surface, said inner surface of said side plate members being disposed toward said inner side of said side plate assemblies and said outer surface of said side plate members being disposed toward said outer side of said side plate assemblies, said inner sides of said first and second side plate assemblies being disposed on said first and second sides of said inner pad assembly, respectively, each said side plate assembly being pivotally connected to said inner pad assembly;

means for pivotally linking each said ground-engaging member to an adjacent said ground-engaging member;

Said side plate members further comprise a rigid upper portion; and a pliable lower portion attached to said rigid upper portion;

said side plate members further comprise a web portion projecting from said outer surface of said side plate member, said web portion providing reinforcing strength to said side plate member.

6. A soft bottom flexible track belt assembly for wrap-around mounting on vehicle tires, said track assembly comprising:

a multiplicity of ground-engaging members, said ground-engaging members having a ground-engaging portion, a first end and a second end, said ground-engaging members comprising pad members and side plate members;

an inner pad assembly including a multiplicity of said pad members arranged in a plurality of rows, said inner pad assembly having a first side and a second side, and said pad members having an upper surface and a lower surface and a first end and a second end, whereby said inner pad assembly is arranged with said first end of one said pad member pivotally linked to said second end of another said pad member in a next adjacent row, said pad members being thereby linked to form a matrix having gaps between said first end of a said pad member and said second end of a next said pad member in a row;

first and second side plate assemblies including a multiplicity of said side plate members, said first and second side plate assemblies having an inner side and an outer side, said side plate members having an inner surface and an outer surface, said inner surface of said side plate members being disposed toward said inner side of said side plate assemblies and said outer surface of said side plate members being disposed toward said outer side of said side plate assemblies, said inner sides of said first and second side plate assemblies being disposed on said first and second sides of said inner pad assembly, respectively, each said side plate assembly being pivotally connected to said inner pad assembly;

means for pivotally linking each said ground-engaging member to an adjacent said ground-engaging member; and said first and second side plate assemblies further comprise:

a multiplicity of link members, said link members having a first end and a second end, said first end of a said link member being pivotally attachable to said second end of a said side plate member, and said second end of a said link member being pivotally attachable to said first end of a next adjacent side plate member, whereby said link members assist in spreading concentrated loads carried by the track belt assembly throughout the track belt assembly.

7. The soft bottom flexible track belt assembly described in claim 6, further comprising:

means for adjusting the length of the track belt assembly.

8. The soft bottom flexible track belt assembly described in claim 7, wherein said means for adjusting the length of the track belt assembly comprises:

a primary pad linkage aperture adjacent said first end of each said pad member for said pivotal linkage to said second end of an adjacent ground-engaging member;

first and second secondary pad linkage apertures adjacent said second end of each said pad member for said pivotal linkage to said first end of another adjacent said ground-engaging member, said first secondary linkage aperture being longitudinally spaced from said second secondary linkage aperture;

a primary side plate linkage aperture adjacent said first end of each said side plate member for said pivotal linkage to one of said secondary pad linkage apertures;

a secondary side plate linkage aperture adjacent said second end of each said side plate member for said pivotal linkage to said primary pad linkage aperture;

a primary link member linkage aperture adjacent said first end of each said link member;

first and second secondary link member linkage apertures adjacent said second end of each said link member;

a multiplicity of retention bolts pivotally engaging said side plate members, said pad members and said link members, said retention bolts having a first end and a second end; and retaining means for retaining said retention bolts in pivotal relationship with said side plate members, said pad members and said link members, whereby each said retention bolt passes alternately through a said link member linkage aperture, a said side plate linkage aperture of said first side plate assembly, a plurality of said pad linkage apertures, alternating between primary pad linkage apertures and secondary pad linkage apertures, a said side plate linkage aperture of said second side plate assembly, and another said link member linkage aperture, and retaining means are attached to said first and second ends of said retention bolt to securely retain said retention bolt in position.

9. The soft bottom flexible track belt assembly described in claim 8, wherein:

said first end of each said retention bolt is fixedly attached to said primary link member linkage aperture; and said retaining means for retaining said retention bolts comprises a retention nut that threadedly engages said second end of each said retention bolt.

* * * * *